United States Patent [19]

Goto et al.

[11] Patent Number: 5,016,129
[45] Date of Patent: May 14, 1991

[54] FLYING-TYPE COMPOSITE MAGNETIC HEAD WITH APPROPRIATE BONDING GLASSES AND METHOD OF PRODUCING SAME

[75] Inventors: Ryo Goto; Tadafumi Tomitani, both of Mouka; Fumio Nitanda, Fukaya; Masanobu Yamazaki; Manabu Toyoda, both of Mouka; Makoto Ushijima, Tokyo, all of Japan

[73] Assignee: Hitachi Metals, Ltd., Tokyo, Japan

[21] Appl. No.: 330,216

[22] Filed: Mar. 29, 1989

[30] Foreign Application Priority Data

Mar. 29, 1988 [JP] Japan ................................. 63-75259
Apr. 7, 1988 [JP] Japan ................................. 63-85718

[51] Int. Cl.$^5$ ............................................. G11B 5/60
[52] U.S. Cl. .................................................. 360/103
[58] Field of Search ........................ 360/103, 122, 104

[56] References Cited

U.S. PATENT DOCUMENTS 4,897,915 2/1990 Ito ........................................ 360/103
4,916,563 4/1990 Kawase ................................ 360/122

FOREIGN PATENT DOCUMENTS 0156220 10/1985 European Pat. Off. .
1273057 5/1972 United Kingdom .
1494840 12/1977 United Kingdom .
1572049 7/1980 United Kingdom .

Primary Examiner—Robert S. Tupper

[57] ABSTRACT

A flying-type composite magnetic head includes (a) a magnetic core constituted by a pair of core pieces bonded together by a first glass portion, at least one of opposing surfaces of the core pieces being formed with a thin magnetic metal layer; (b) a non-magnetic slider having a slit for receiving the magnetic core; and (c) a second glass portion for fixing the magnetic core in the slit; the first glass portion having a softening point lower than a first bonding temperature by 70° C. or more and a yielding temperature higher than a second bonding temperature, and the second glass portion having a softening point lower than a second bonding temperature by 70° C. or more. The first bonding temperature $T_1$ °C.) for forming the first glass portion satisfies the following relation:

$$T_1 \leq aW + b,$$

wherein W is a thickness (μm) of the thin magnetic metal layer, a is between $-25$ and $-15$ and b is between 720 and 770, and a second bonding temperature $T_2$ for forming the second glass portion is 530° C. or lower.

5 Claims, 7 Drawing Sheets

FLYING-TYPE COMPOSITE MAGNETIC HEAD WITH APPROPRIATE BONDING GLASSES AND METHOD OF PRODUCING SAME

BACKGROUND OF THE INVENTION

The present invention relates to a flying-type composite magnetic head for use in a magnetic disk drive in such a manner that it is slightly floating over a magnetic recording medium, and a method of producing the composite magnetic head.

As magnetic heads used for writing and reading information in magnetic disk apparatuses, flying-type magnetic heads as shown in U.S. Pat. No. 3,823,416 and Japanese Patent Publication No. 57-569 are widely used. Such a flying-type magnetic head is constituted by a slider, a tail end of which is provided with a magnetic gap, and the overall slider body is constituted by an oxide-type magnetic material with high permeability.

The flying-type magnetic head is in light contact with a magnetic disk by a spring force when the magnetic disk is stationary. When the magnetic disk is rotating, a flow of air over the magnetic disk exerts an upward force to a lower surface of the slider, whereby the magnetic head floats over the magnetic disk. When the magnetic disk starts to rotate or stops, the magnetic head comes into sliding contact with the magnetic disk. Here, the contact condition of the magnetic head with the magnetic disk when the magnetic disk is stopped will be explained in detail. First, the flow of surface air becomes gradually slow when the rotation speed of the magnetic disk is reduced. When the magnetic head loses its floating force, it collides with the disk surface and jumps up by its reaction and then falls onto the disk surface again. Such movement is repeated and the magnetic head slides on the disk to finally stop. Accordingly, the magnetic head should withstand shocks at the time of start and stop, and such characteristics are sometimes called CSS characteristics (contact start stop characteristics).

Flying-type magnetic heads are generally constituted by ferrite which is an oxide-type magnetic material with high permeability have relatively good CSS characteristics. However, the ferrite has a small saturation magnetic flux density, so that sufficiently high recording densities cannot be achieved to recording media having high coercive forces. Specifically, even with use of a Mn-Zn ferrite having a relatively high saturation magnetic flux density Bs, its Bs is at most 5000 G or so.

It was then found that to achieve Bs of 8000 G or more, a magnetic head is desirably provided with a thin magnetic metal layer in its magnetic gap. For instance, Japanese Patent Laid-Open No. 58-14311 proposes a flying-type magnetic head composed of ferrite and provided with a magnetic metal layer with high saturation magnetic flux density only in a magnetic gap portion thereof. However, in this magnetic head, a magnetic transformation part has large inductance after provided with coil windings, so that it has low resonance frequency. This means that it is disadvantageous in recording and reproducing at high frequency. Here, the large inductance is due to the fact that the overall magnetic head is composed of a magnetic material.

Accordingly, to achieve low inductance, a magnetic circuit should be made small. From this point of view, U.S. Pat. No. 3,562,444 discloses a flying-type composite magnetic head in which a magnetic core is embedded in and fixed to a non-magnetic slider, without constituting the entire magnetic head with a magnetic material.

Further, the present inventors proposed in Japanese Patent Laid-Open No. 61-199219 a flying-type magnetic head in which a magnetic core is embedded in a non-magnetic slider.

It has been found from the above that to obtain a flying-type composite magnetic head having good recording characteristics to high-coercive force recording media and small inductance, a composite magnetic core should be constituted by a Mn-Zn ferrite substrate with a high saturation magnetic flux density Bs and coated with a thin magnetic layer having high Bs in its magnetic gap portion. Such a magnetic core should thus be embedded in a non-magnetic slider.

Gap structures of magnetic cores assembled in such flying-type composite magnetic heads are known as an X-type as proposed by Japanese Patent Laid-Open No. 61-199217 and a so-called parallel type which has a notch for regulating a track width on a track surface of a magnetic core. Both the X-type and parallel-type magnetic cores are constituted by I-shaped core pieces and C-shaped core pieces. The I-shaped core pieces are formed with thin magnetic metal layers made of Fe-Al-Si, etc. Incidentally, the parallel-type magnetic cores are advantageous in that their magnetic gaps are easily formed and their track widths are precisely regulated.

However, since the thin magnetic metal layer and the core piece generally have largely different thermal expansion coefficients, the thin magnetic metal layer tends to peel off from the core piece, or the core pieces are likely to be cracked due to internal stress in a bonding portion with the thin magnetic layer, when the core pieces are bonded with each other by glass, or when the magnetic core is fixed to a non-magnetic slider. If cracking takes place in core pieces from which thin magnetic layers peel off, reproduction characteristics are deteriorated by a pseudo-gap effect which causes small peaks (subpeaks) to appear in other regions than signal regions.

Various attempts have been made to solve the above problems. For instance, to prevent the problems of peeling and cracking due to the difference in thermal coefficient between the core pieces and thin magnetic metal layer, a thinning of the metal layer is considered. However, it is not preferable to make the metal layer extremely thin because it leads to the deterioration of its magnetic properties.

In the production of such a flying-type composite magnetic head, a C-shaped core piece and an I-shaped core piece are first bonded to each other to form a magnetic core, and the magnetic core is inserted into a slit of a non-magnetic slider with a glass rod placed thereon, and heated at high temperature to cause the glass to flow into a gap between the magnetic core and the non-magnetic slider. As a result, the magnetic core is fixed to the slider. However, if the heating temperature is too high, a gap portion of the magnetic core formed with a glass would be loosened or expanded, resulting in the deterioration of magnetic head characteristics. Accordingly, in the bonding of the magnetic core, a low-melting point glass should be used. Conventionally used as a low-melting point glass is typically the following glass:

| Corning Glass 8463 | |
| --- | --- |
| Softening point | 377° C. |
| Thermal expansion coefficient | 105 × 10⁻⁷/°C. (25–310° C.) |

However, since this low-melting point glass has poor strength, cracking easily takes places even with a small difference in the thermal expansion coefficient. In addition, it has poor resistance to environmental conditions and is susceptible to discoloration, etc.

The inventors of the present invention thus proposed in Japanese Patent Laid-Open No. 60-243182 a glass for bonding magnetic cores made of Mn-Zn ferrite, a ferromagnetic oxide, to a non-magnetic slider, which has a composition of:
$SiO_2$: 9–12 weight %,
$B_2O_3$: 3–9 weight %,
$Al_2O_3$: 3–6 weight %, and
PbO: 76–82 weight %.

This bonding glass has a softening point of 404°–446° C. and a thermal expansion coefficient of $87.6-96.4 \times 10^{-7}$/°C. (30°–280° C.).

Although the above low-melting point glass has a sufficiently low melting point for bonding magnetic cores, it is not necessarily satisfactory in corrosion resistance, particularly in acid resistance and water resistance. Accordingly, in the process of washing after assembling, discoloration may take place, and large steps may be generated between the surfaces of the magnetic core and the slider and the glass surface.

On the other hand, with respect to a glass for bonding magnetic cores, if it has too high a softening point, a first bonding temperature, at which core pieces are bonded together, also becomes too high, thus causing the peeling of thin magnetic metal layers. Also, if it has too low a yielding temperature, magnetic gaps may change in the process of second bonding for fixing the magnetic cores to non-magnetic sliders.

SUMMARY OF THE INVENTION

Accordingly, an object of the present invention is to provide a flying-type composite magnetic head containing a magnetic core having a thin magnetic metal layer free from the above problems.

Another object of the present invention is to provide a flying-type composite magnetic head containing a magnetic core bonded together with a glass having a low softening point and a sufficiently high yielding temperature.

A further object of the present invention is to provide a flying-type composite magnetic head containing a magnetic core bonded to a non-magnetic slider with a low-melting point glass having good corrosion resistance.

A still further object of the present invention is to provide a method of producing such flying-type composite magnetic heads.

As a result of intense research in view of the above objects, the inventors have found that by selecting a first glass for producing magnetic cores and a second glass for fixing magnetic cores to non-magnetic sliders so that the softening point and yielding temperature of the first glass and the softening point of the second glass are within particular ranges relative to the first bonding temperature and the second bonding temperature, it is possible to provide magnetic cores showing good characteristics without suffering from the peeling of thin magnetic metal layers and the cracking of core pieces. It has also been found that by selecting a first bonding temperature in a particular range which has a close relation with the thickness of a thin magnetic metal layer, magnetic heads free from the above problems can be obtained. It has further been found that a second bonding glass can be provided with a low melting point and improved corrosion resistance by reducing the content of $SiO_2$ and increasing the content of $Al_2O_3$. The present invention is based upon these findings.

Thus, the flying-type composite magnetic head according to the present invention comprises (a) a magnetic core constituted by a pair of core pieces bonded together by a first glass portion, at least one of opposing surfaces of the core pieces being formed with a thin magnetic metal layer having a thickness of 1.5 to 5.0 μm; (b) a non-magnetic slider having a slit in which the magnetic core is fixed by a second glass portion, wherein the first glass portion has a softening point of 560°–580° C. and a yielding temperature of 500°–530° C. and the second glass portion has a softening point of 410°–450° C.

The preferred composition of the first glass portion is 35–40 weight % of $SiO_2$, 9–15 weight % of $B_2O_3$, 9–12 weight % of at least one alkali metal oxide and 36–42 weight % of PbO.

The preferred composition of the second glass portion is 4.5–8.5 weight % of $SiO_2$, 4.5–9.5 weight % of $B_2O_3$, 6–8 weight % of $Al_2O_3$ and 77.5–82.5 weight % of PbO.

The method of producing the flying-type composite magnetic head according to the present invention comprises the steps of: (a) contacting a pair of magnetic core blocks together, at least one of opposing surfaces of the core blocks being formed with a thin magnetic layer having a thickness W of 1.5 to 5.0 μm, to provide a magnetic gap between the magnetic core blocks; (b) bonding the two magnetic core blocks with a first glass at a first bonding temperature $T_1$ (°C.) more than 70° C. above a softening point of the first glass, and lower than or equal to a temperature defined by a formula: $aW+b$, wherein a is −25 to −15 and b is 720 to 770; (c) machining the bonded core blocks to a magnetic core having a regulated track width; (d) preparing a non-magnetic slider having a slit for receiving the magnetic core; (e) positioning the magnetic core in the slit of the slider; and (f) bonding the magnetic core in the slit with a second glass at a second bonding temperature $T_2$ lower than the yielding temperature of the first glass and more then 70° C. above the softening point of the second glass.

DETAILED DESCRIPTION OF THE PREFERRED EMBODIMENTS

The present invention will be explained in detail referring to the attached drawings.

Figure 1:
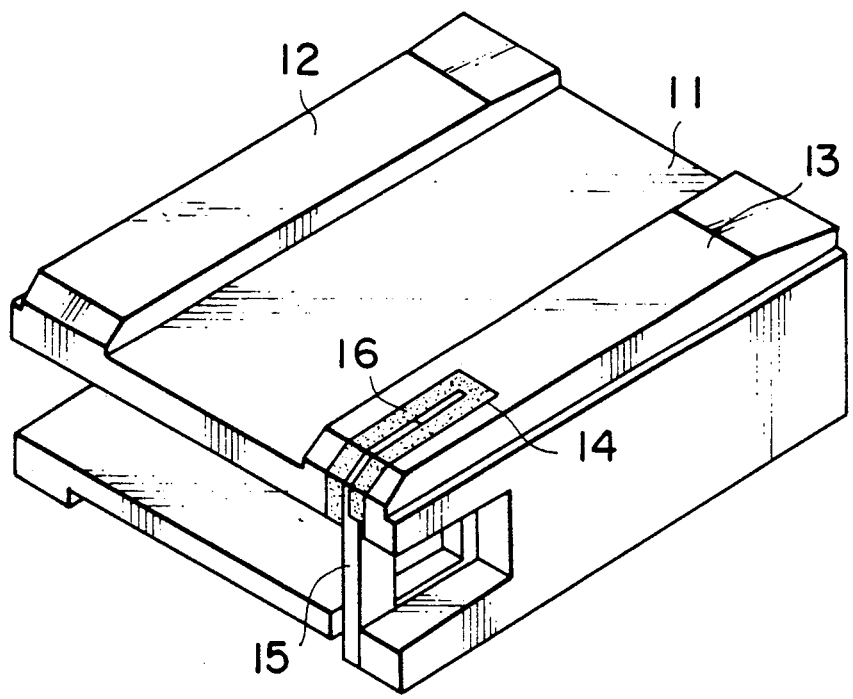
FIG. 1 is a perspective view showing a flying-type composite magnetic head according to one embodiment of the present invention.

FIG. 1 shows the entire structure of a flying-type composite magnetic head according to one embodiment of the present invention. The flying-type composite magnetic head comprises a non-magnetic slider 11, a pair of side rails 12, 13 extending on both lateral side ends of the slider 11, a slit 14 extending in one side rail 13, a magnetic core 15 embedded in the slit 14 and a glass portion 16 for fixing the magnetic core 15 in the slit 14. Incidentally, the slider 11 is desirably made of a non-magnetic ceramic such as $CaTiO_3$ having a thermal expansion coefficient of $105-115 \times 10^{-7}/°C$. and a porosity of 0.5% or less.

Figure 2:
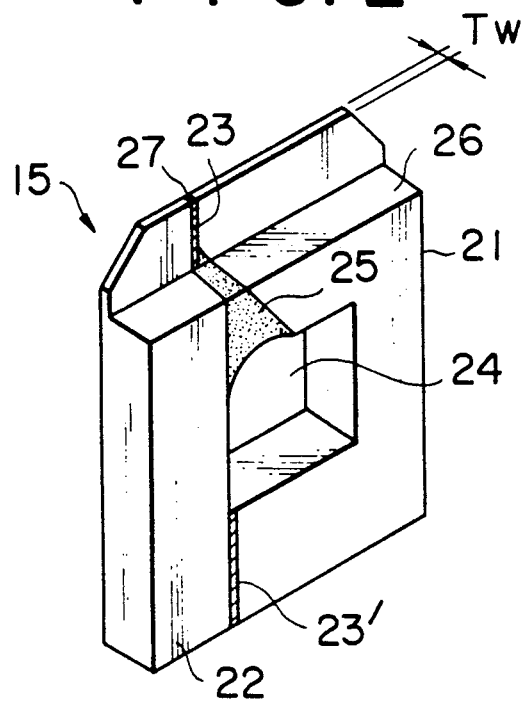
FIG. 2 is a perspective view showing one example of a magnetic core to be assembled in the flying-type composite magnetic head of FIG. 1.

FIG. 2 is an enlarged perspective view of the magnetic core 15. The magnetic core 15 is constituted by a C-shaped core piece 21 and an I-shaped core piece 22 both made of Mn-Zn ferrite, and a first thin Fe-Al-Si layer 23 formed on the I-shaped core piece 22. The I-shaped core piece 22 may also be formed with a second thin Fe-Al-Si layer 23'. It has a space called window 24 for coil-winding, which is defined by the C-shaped core piece 21 and the I-shaped core piece 22. An upper portion of the coil-winding window 24 is filled with a first glass portion 25 for bonding the C-shaped core piece 21 and the I-shaped core piece 22.

The magnetic core 15 is provided in its track surface with a notch 26 extending longitudinally of the magnetic core 15 for or defining a track width Tw. With this notch 26, the track width Tw of a magnetic gap 27 can be set arbitrarily. Incidentally, the magnetic gap 27 is provided with a gap length-defining layer such as an $SiO_2$ layer, etc. formed by sputtering, etc. This magnetic core generally has a shape as shown below:

| | |
|---|---|
| Track width Tw | 13–20 μm |
| Magnetic gap length Gl | 0.5–0.8 μm |
| Magnetic gap depth Gd | 2–15 μm |
| Core width | 150–170 μm |

This magnetic head can be produced by the following steps. First, ferrite blocks for producing the I-shaped core piece and the C-shaped core piece are prepared. These ferrite blocks are desirably made of Mn-Zn ferrite having high Bs and extremely high permeability at high frequency. In addition, to reducing voids in the glass which tend to appear during the process of glass bonding, the ferrite blocks are desirably given high density by means of a hot isostatic pressing method. Particularly preferred is Mn-Zn polycrystalline ferrite with $B_{10}=4700-5400$ G, Hc=0.1-0.2 Oe, a permeability of 800–1300 at 5 MHz, a porosity of 0.5% or less and a thermal expansion coefficient of $105-130 \times 10^{-7}/°C$. However, a single crystal ferrite can be used instead of the polycrystalline ferrite.

Either one of the core pieces is provided with a thin magnetic metal layer. For easiness, the metal layer is formed on the I-shaped core piece. The preferred thin magnetic metal layer is a thin Fe-Al-Si layer formed by sputtering. As sputtering conditions, 5–12 mTorr of Ar gas pressure is desirable to maintain stable discharge. To prevent the cracking of an Fe-Al-Si alloy target due to a temperature increase and to obtain a thin film formation speed of about 800 Å/min, the electric power is desirably 600–1200 W in the case of a target of 150 mm in diameter.

To achieve high permeability, the composition of the Fe-Al-Si layer is desirably 83–86% of Fe, 5–8% of Al and 8–11% of Si by weight. To obtain a small magnetostriction constant, it is desired that Fe is 83.5–85%, Al is 5–7%, and Si is 9–10.5% by weight. To improve its corrosion resistance, the thin Fe-Al-Si layer may contain a small amount of additives. In this case, it is desired to add 2 weight % or less of Ti, Ru, Cr, etc. alone or in combination.

The formation of the thin Fe-Al-Si layer partially on the I-shaped core piece is conducted by using a masked sputtering method. This method is generally conducted by using a combination of an I-shaped core block holder and a mask having openings through which the thin magnetic metal layers are formed on each ferrite core block. The size and position of each opening in the mask is determined depending upon the size and position of each metal layer to be formed on the core block.

Figure 3:
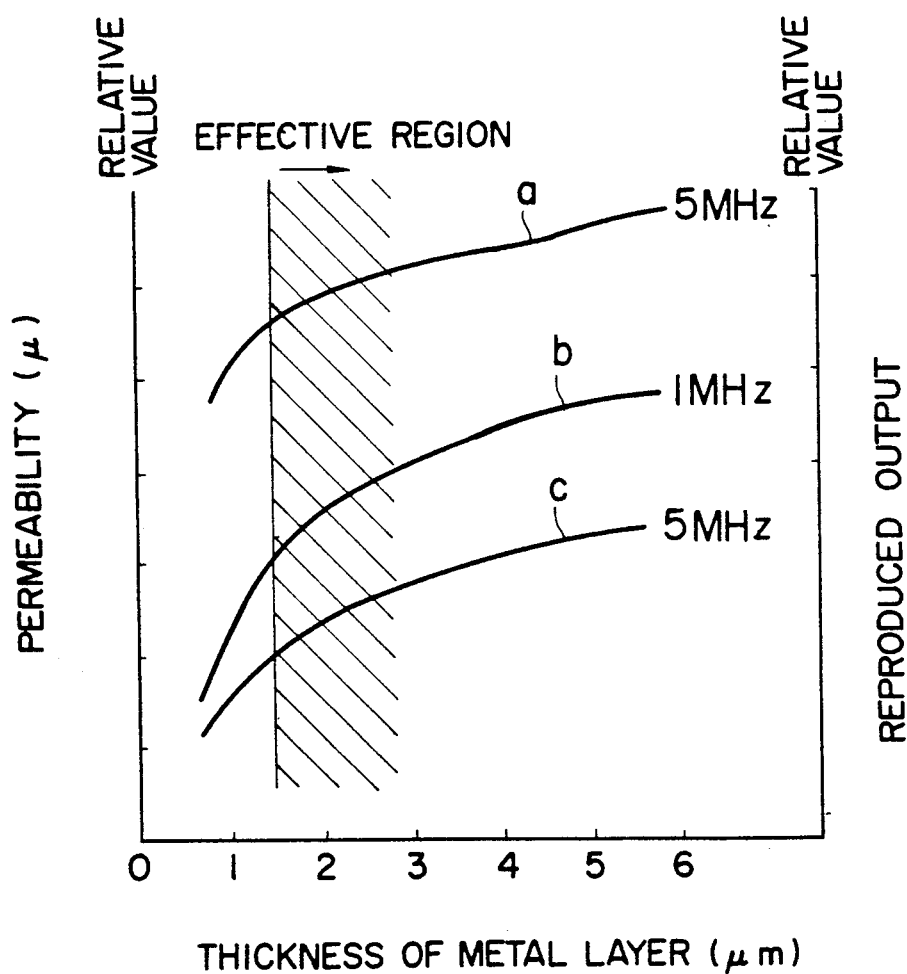
FIG. 3 is a graph showing the general relation between the thickness of a thin magnetic metal layer and permeability and reproduced output.

The thickness of a thin Fe-Al-Si layer is determined by taking into consideration magnetic head characteristics, the peeling of the thin layer and the cracking of core pieces. FIG. 3 is a graph schematically showing the general relation between the metal layer thickness and permeability and reproduced output. In FIG. 3, "a" denotes reproduced output at 5 MHz, and "b" and "c" denote permeability at 1 MHz and 5 MHz, respectively. As is clear from FIG. 3, as the metal layer thickness increases, both the reproduced output and the permeability tend to increase. When the thin Fe-Al-Si layer has a thickness of 1.5 μm or more for practical purposes, sufficient reproduced output and permeability can be obtained. However, if the metal layer thickness becomes too large, the peeling of a thin Fe-Al-Si layer from core pieces and the cracking of core pieces become likely. In general, when the metal layer thickness exceeds 5 μm, peeling and cracking are likely to take place at a usual first bonding temperature. Accordingly, the thickness of a thin Fe-Al-Si layer is usually 1.5–5 μm.

Figure 4:
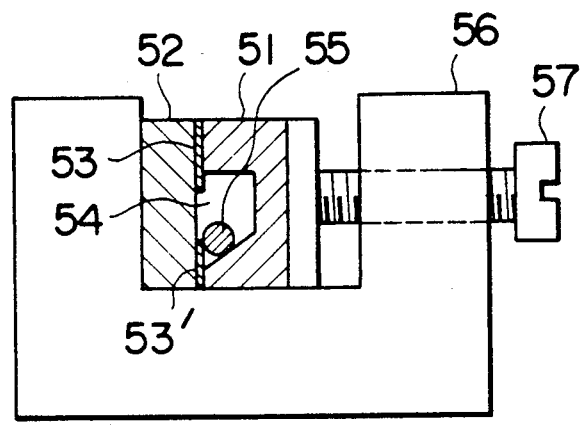
FIG. 4 is a cross-sectional view showing core blocks assembled by a jig, a coil-winding window of the assembled core blocks receiving a glass rod for bonding the core blocks.

Next, as is shown in FIG. 4, a I-shaped core block 52 coated with thin Fe-Al-Si layers 53, 53' are brought into contact with a C-shaped core block 51, and the assembled core blocks are set in a jig 56 and fixed by a screw 57. In this state, a glass rod 55 is inserted into the resulting window 54 for coil winding and melted therein to bond the two core blocks together (first bonding). The bonded blocks are cut, and each cut piece is provided with a notch for regulating a track width Tw to produce a magnetic core.

Figure 5:
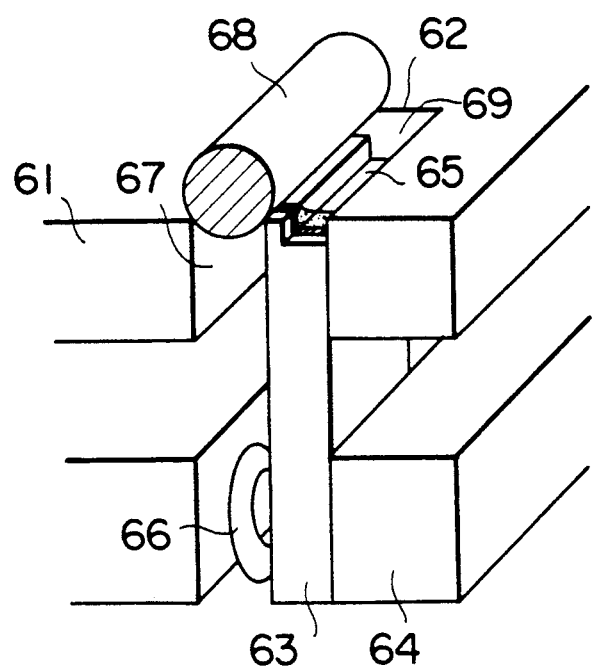
FIG. 5 is a perspective view showing the step of fixing the magnetic core to a slider with a second glass to produce the flying-type composite magnetic head of FIG. 1.

The fixing of this magnetic core to the slit of the slider is conducted as follows. FIG. 5 is a perspective view showing a state in which a bonded magnetic core 63 is placed in a slit 62 of a slider 61, and a second glass rod 68 is placed on the slider 61 over a slit 62. Since a notch 65 of the magnetic core 63 faces an outside portion 64 of the slider 61, there are gaps 67, 69 between the magnetic core 63 and the inner surfaces of the slit 62, even when the magnetic core 63 is in forced contact with the inner surface of the outside portion 64. The provisional fixing of the magnetic core 63 in the slit 62 is achieved easily by a spring member 66 forcefully inserted in a gap between one side of the magnetic core 63 and the opposing inner surface of the slit 62. The glass rod 68 is to constitute a second glass portion for fixing the magnetic core 63 to the slit 62. After fixing with the second glass, an air-bearing surface of the magnetic head is ground and lapped to finish the magnetic head.

In the above production process of a magnetic head, the following heating steps are conducted:
(1) First bonding step . . . Bonding core pieces with a first glass to produce a magnetic core.
(2) Second bonding step . . . Fixing the magnetic core in a slit of a non-magnetic slider with a second glass.

In the second bonding step, the first glass portion of the magnetic core is also heated, making it likely that the magnetic gap is changed. To prevent this completely, it is necessary that the yielding temperature of the first glass is higher than the second bonding temperature. Further, to achieve sufficient flowability of the first glass in the first bonding step and the second glass in the second bonding step, it is necessary that the first bonding temperature and the second bonding temperature are sufficiently higher than the softening points of the first glass and the second glass, respectively. Specifically, the following requirements should be met:
(1) First glass . . . Having a softening point lower than the first bonding temperature by 70° C. or more and a yielding temperature higher than the second bonding temperature.
(2) Second glass . . . Having a softening point lower than the second bonding temperature by 70° C. or more.

However, with respect to the second glass, its corrosion resistance tends to deteriorate as the softening point decreases. Accordingly, the softening point of the second glass should be equal to or higher than a certain level. From these points of view, the first glass desirably has a softening point of 540°-630° C., particularly 560°-580° C., and a yielding temperature of 500°-530° C., and the second glass desirably has a softening point of 410°-450° C. In this case, the first bonding temperature is preferably 640°-730° C., and the second bonding temperature is preferably 490°-530° C.

As the bonding glass (first glass) showing such characteristics, there may be many combinations of $PbO$—$SiO_2$ as main components and other various components. The experiments of the inventors have revealed that the following glass compositions are suitable:
(a) $PbO$—$SiO_2$ and one or more alkali metal oxides ($K_2O$, $Li_2O$, $Na_2O$, etc.);
(b) $PbO$—$SiO_2$—$B_2O_3$ and one or more alkali metal oxides; and
(c) $PbO$—$SiO_2$—$B_2O_3$—$Al_2O_3$ and one or more alkali metal oxides.

In these glass compositions, the preferred compositions, by weight, are as follows:
(a) 28-49% of $SiO_2$, 44-59% of PbO and 7-13% of at least one alkali metal oxide;
(b) 28-49% of $SiO_2$, 5-15% of $B_2O_3$, 7-13% of at least one alkali metal oxide and the balance substantially PbO; and
(c) 28-49% of $SiO_2$, 5-15% of $B_2O_3$, 5-12% of $Al_2O_3$, 7-13% of at least one alkali metal oxide and the balance substantially PbO.

These first glasses generally have thermal expansion coefficients of $94-103 \times 10^{-7}$/°C.

Figure 6:
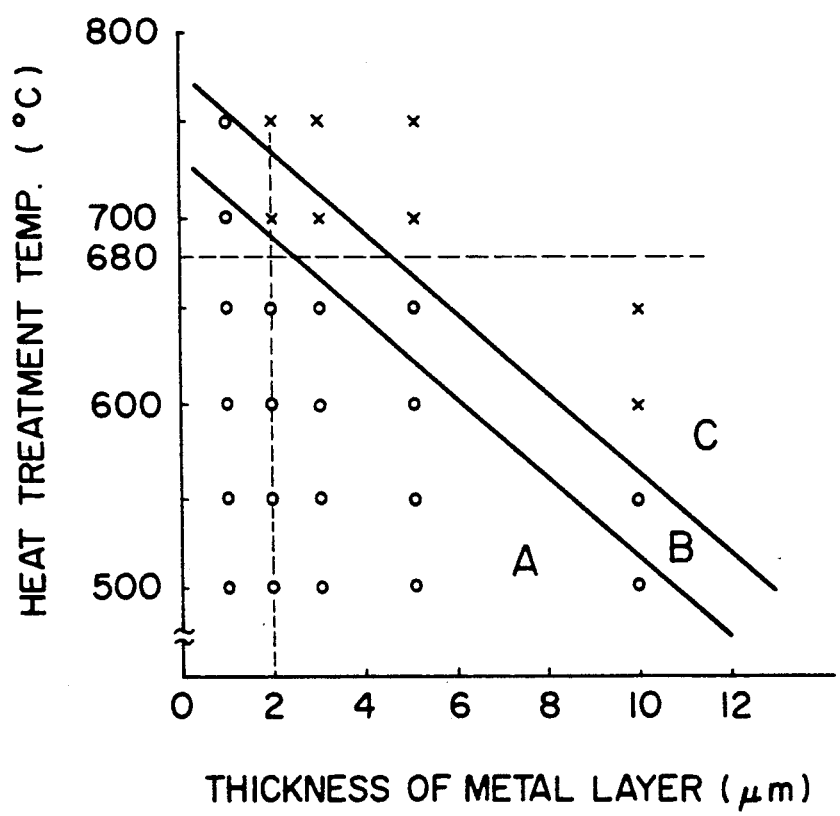
FIG. 6 is a graph showing the peeling of a thin magnetic metal layer at various layer thicknesses and various heat treatment temperatures.

Among them, a particularly preferable first glass composition is, by weight, 35-40% of $SiO_2$, 9-15% of $B_2O_3$, 9-12% of at least one alkali metal oxide and 36-42% of PbO. The alkali metal oxide is preferably $Na_2O$. The first glass of this composition has a yielding temperature of 505°-520° C. Thus, when a thin Sendust layer of 2 μm or so is formed on a ferrite core as shown in FIG. 6, this first glass makes it possible to conduct the bonding of core pieces at a first bonding temperature of 680° C. or lower.

In the above composition, $SiO_2$ is 35-40 weight %. When $SiO_2$ exceeds 40 weight %, the softening point of the first glass increases, so that the first glass does not flow at a first bonding temperature of 680° C. or lower. On the other hand, when it is less than 35 weight %, the first glass has a low yielding temperature, making it likely that the magnetic gap is loosened at the time of bonding of the magnetic core to the slider. $B_2O_3$ is 9-15 weight %. When $B_2O_3$ exceeds 15 weight %, the first glass has a low thermal expansion coefficient, and when it is lower than 9 weight %, the thermal expansion coefficient of the first glass excessively increases, causing the cracking of the first glass in the process of bonding the ferrite cores. Further, the alkali metal oxide (particularly $Na_2O$) is 9-12 weight %. When it exceeds 12 weight %, the yielding temperature of the first glass decreases, and the thermal expansion coefficient increases. On the other hand, when it is less than 9 weight %, the increase in the softening point and the decrease in the thermal expansion coefficient undesirably take place. With respect to PbO, when it exceeds 42 weight %, the yielding temperature of the first glass decreases, and when it is lower than 36 weight %, the increase in the softening point of the first glass and the decrease in the density of the first glass take place, making it less likely that the first glass flows into a magnetic gap.

With respect to the yielding temperature, it is important because the yielding temperature of the first glass has a close relation with the loosening of a magnetic gap in the step of second bonding between the magnetic core and the slider. For instance, when the second bonding temperature for bonding the magnetic core to the slider is 505° C., a glass having a yielding temperature less than 505° C. is undesirable because it suffers from loosening of the magnetic gap. On the other hand, a glass having a yielding temperature exceeding 520° C. is also undesirable because it does not easily flow into the magnetic gap due to its high softening point.

A particularly preferred example of the first glass is, by weight %, 40 PbO-37 $SiO_2$-13 $B_2O_3$-10 $Na_2O$ which has a softening point of 560° C. and a thermal expansion coefficient of $95 \times 10^{-7}$/°C. When the magnetic core pieces are bonded with such a first glass, the bonding strength of the magnetic core is as high as 5 kg/mm², without causing any corrosion of the thin Fe-Al-Si layer.

Incidentally, $SiO_2$ has a function to prevent the corrosion of the glass in a highly humid condition. However, when $SiO_2$ is excessive, the wettability of the thin Fe-Al-Si layer or the ferrite core by the glass decreases, resulting in insufficient bonding strength. $Al_2O_3$ has a function to prevent the discoloration of the glass at a high temperature. However, when it is excessive, the glass has too high a softening point, making it unable to achieve easy bonding. In addition, alkali metal oxides have a function to adjust the flowability of the glass.

Preferably as the second glass, a glass has a composition of 70-83% of PbO, 3-10% of $Al_2O_3$, 4-10% of $SiO_2$ and 4-10% of $B_2O_3$ by weight. It has a thermal expansion coefficient of $87-96 \times 10^{-7}/°C$. and a softening point of 370°-480° C. or so.

One example of a particularly preferred glass composition for the second glass portion is 80 PbO-7 $Al_2O_3$-6 $SiO_2$-7 $B_2O_3$ (by weight %). This glass has a thermal expansion coefficient of $93 \times 10^{-7}/°C$. and a softening point of 440° C. By conducting the fixing of the magnetic core in the slit of the slider with this second glass at 530° C., cracks can be avoided.

The preferred composition of the second glass having a low softening point and excellent corrosion resistance is as follows:
$SiO_2$ 4.5-8.5 weight %,
$B_2O_3$ 4 5-9.5 weight %,
$Al_2O_3$ 6-8 weight %,
PbO 77.5-82.5 weight %.

$SiO_2$ is 4.5-8.5 weight %. When it is lower than 4.5 weight %, the crystallization of the second glass takes place, and its resistance to environmental conditions and acid decreases. When it exceeds 8.5 weight %, the second glass has a softening point elevated by synergistic effects with $Al_2O_3$, reducing the flowability of the glass. The more preferred content of $SiO_2$ is 5-7 weight %.

$Al_2O_3$ is 6-8 weight %. When it is less than 6 weight %, its resistance to environmental conditions and resistance to acid are deteriorated, and when it exceeds 8 weight %, its softening point is elevated, reducing the flowability of the glass. The more preferred content of $Al_2O_3$ is 6.5-7.5 weight %.

$B_2O_3$ has a function to regulate the thermal expansion coefficient of the glass within a proper range. Its content is preferably 4.5-9.5 weight %. When it is less than 4.5 weight %, the thermal expansion coefficient of the second glass increases, and when it exceeds 9.5 weight %, the thermal expansion coefficient decreases. Further, when the $B_2O_3$ content is small, the crystallization of the glass is likely to take place. The more preferred content of $B_2O_3$ is 6-7 weight %.

In this glass composition, PbO is 77.5-82.5 weight %. When it exceeds 82.5 weight %, the second glass tends to be crystallized, and when it is lower than 77.5 weight %, the softening point of the second glass increases, thereby lowering its flowability. The more preferred content of PbO is 78-82 weight %.

The second glass of the above composition has a softening point of 412°-436° C. and a thermal expansion coefficient of $88-96 \times 10^{-7}/°C$. at 30°-280° C. The above softening point and thermal expansion coefficient are substantially the same as those of bonding glasses disclosed in Japanese Patent Laid-Open No. 60-243182, but the second glass of the above composition is characterized in that it shows extremely improved resistance to environmental conditions, namely, resistance to water, humidity and acid. Particularly, to prevent the discoloration of the second glass in the washing process after completion of the magnetic head and to prevent the generation of steps between the second glass surface and the magnetic core surface and the slider surface, the acid resistance and water resistance are extremely important factors to the second glass, and these properties have been improved by using the second glass of the present invention. Accordingly, using the second glass of the present invention, a magnetic head with excellent resistance to environmental conditions and thus high reliability can be obtained.

Next, to prevent the peeling of the thin magnetic metal layer and the cracking of the core pieces, the first bonding temperature should have a close relation with the thin magnetic layer made of an Fe-Al-Si alloy. In general, (1) As the thin magnetic metal layer becomes thicker, the peeling and the cracking become more likely, and (2) For the same metal layer thickness, as the first bonding temperature increases, the peeling and the cracking become more likely.

Thus, the peeling of the thin magnetic metal layer and the cracking of the core pieces have been investigated for thin Fe-Al-Si layers of various thicknesses at various heat treatment temperatures. As a result, it has been found that neither peeling nor cracking takes place when the metal layer thickness W ($\mu$m) and the first bonding temperature $T_1$(°C.) satisfy the following relation:

$$T_1 \leq aW + b$$

wherein $-25 \leq a \leq -15$, and $720 \leq b \leq 770$.

Namely, the first bonding temperature $T_1$ and the metal layer thickness W have a relation expressed by a linear function, meaning that the larger the metal layer thickness, the lower the first bonding temperature. Incidentally, the first bonding temperature should be higher than the softening point Ts of the first glass by 70° C. or more.

The present invention will be explained in further detail by means of the following Examples.

EXAMPLE 1

To produce a magnetic core having a structure shown in FIG. 2, a C-shaped core block and an I-shaped core block were produced from Mn-Zn polycrystalline ferrite. The Mn-Zn polycrystalline ferrite was compressed by a hot isostatic pressing method to have a porosity of 0.1%, and it had magnetic properties in which $B_{10}=5100$ G, Hc=0.15 Oe and permeability at 5 MHz=950. Further, it had a thermal expansion coefficient of $115 \times 10^{-7}/°C$.

Each of the C-shaped core block and the I-shaped core block was formed by using a peripheral slicer, and ground with a flat grinder and then lapped. After lapping, each core block was boiled in trichloroethylene, and then subjected to ultrasonic cleaning in trichloroethylene, acetone and alcohol, respectively. After that, it was boiled in freon and finally washed in a freon vapor.

Thin Fe-Al-Si layers having various thicknesses were formed on the I-shaped core blocks at positions corresponding to a magnetic gap and a back gap by a magnetron sputtering apparatus. The electric power of the magnetron sputtering apparatus was 0.8 kW, its argon pressure was 8 mTorr, and its substrate temperature was 200° C. The thin Fe-Al-Si layer had a composition of 85% Fe, 6% Al and 9% Si by weight.

The I-shaped core blocks formed with thin Fe-Al-Si layers of various thicknesses were subjected to heat treatment at various temperatures between 500° C. and 750° C., and the peeling of the thin magnetic metal layers was observed by a microscope. The results are shown in FIG. 6, in which "O" denotes no peeling and "x" denotes peeling. As is clear from FIG. 6, no peeling was observed in a region A, and peeling was observed in some of the samples in a region B. Further, in a region C, all the samples suffered from peeling. The region A is a region satisfying a=about −20 and b=about 730 in the relation:

$$T_1 \leq aW + b.$$

EXAMPLE 2

Each I-shaped core block formed with the thin Fe-Al-Si layer of 2 μm in thickness as in Example 1 was placed in an RF sputtering apparatus to produce an SiO₂ gap length-defining layer of 0.5 μm in thickness on the thin Fe-Al-Si layer at an electric power of 0.3 kW, argon pressure of 5 mTorr and substrate temperature of 150° C.

A first glass for bonding the C-shaped core piece and the I-shaped core piece had the following composition:
PbO 40 weight %
SiO₂ 37 weight %
B₂O₃ 13 weight %
K₂O 10 weight %

This first glass had a softening point of 573° C., a yielding temperature of 520° C. and a thermal expansion coefficient of $96 \times 10^{-7}/°C$. The bonding of the core blocks with the first glass was conducted by heating them in an electric furnace filled with a nitrogen gas to 700° C. at a heating rate of 200 ° C./hr, and keeping them at 700° C. for 30 minutes.

The core blocks thus bonded were ground by a flat grinder and then lapped, and cut by a peripheral slicer to a thickness of 250 μm, and both sides of each cut piece was lapped to produce a magnetic core of 152 μm in thickness.

Next, to restrict the track width Tw of the resulting magnetic core, it was notched by a high-rigidity dicer in a width of 138.5 μm and a depth of 200 μm.

The magnetic core thus notched had the following structure:

| | |
|---|---|
| Thickness of the magnetic core Cw | 152 μm |
| Track width Tw | 13.5 μm |
| Gap length Gl | 0.55 μm |
| Gap depth Gd* | 5.0 μm |
| Thickness of bonding glass Gw | about 200 μm |

Note*:
Gap depth was determined after assembled in a magnetic head and lapped.

Further, a slider made of a CaTiO₃ ceramic having a thermal expansion coefficient of $108 \times 10^{-7}/°C$. and a porosity of 0.15% was formed with a slit of 1.5 mm in length and 220 μm in width at one end of one side rail thereof, and the magnetic core was provisionally fixed in the slit with a leaf spring. It was then fixed with the following second glass:
PbO 79.5 weight %
SiO₂ 9.5 weight %
Al₂O₃ 4.0 weight %
B₂O₃ 7.0 weight %

The second glass had a thermal expansion coefficient of $94 \times 10^{-7}/°C$., a softening point of 420° C., a transition temperature of 369° C. and a yielding temperature of 396° C. This glass was heated in an electric furnace filled with N₂ at a heating rate of 200° C./hour, and kept at a temperature of 500° C. for 30 minutes, so that it flowed into gaps between the magnetic core and the inner surfaces of the slit. The magnetic head thus produced was ground and lapped with a mirror-finishing grinder and a lapping machine on its air-bearing surface, thereby providing a flying-type composite magnetic head.

Figure 7:
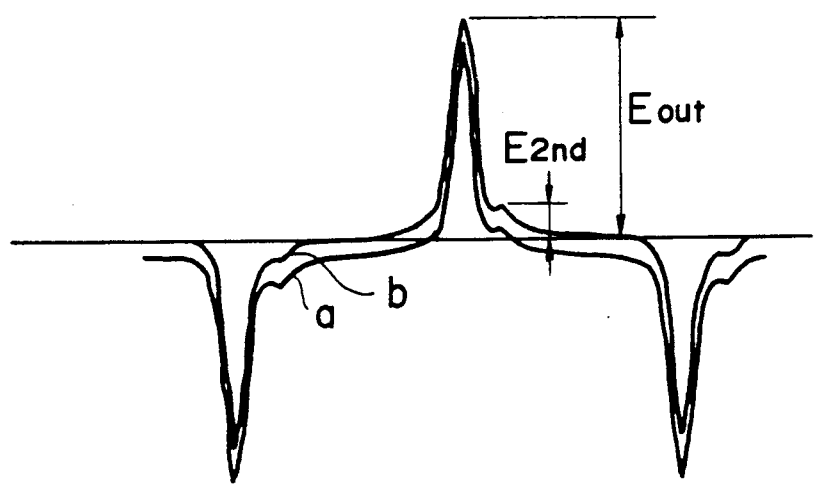
FIG. 7 is a graph showing reproduced output peaks.

Reproduced output characteristics at 5 MHz (relations between writing current consisting of + and − isolated waves and output voltage) were measured on these magnetic heads, by using a 5.25-inch magnetic disk having a Co-Ni sputtered recording layer (Hc=1150 Oe), with a floating height of 0.3 μm and a peripheral speed of 12.1 m/sec. Incidentally, the winding of each magnetic head was 48 turns. The results are shown in FIG. 7, in which "a" and "b" show envelopes of signals including noises.

A ratio of a subpeak's height $E_{2nd}$ to a main peak's height $E_{out}$:

$$\epsilon\ (\%) = E_{2nd}/E_{out} \times 100$$

is a parameter determining how good reproduction characteristics are. In general, $\epsilon$ (%) is required to be 5% or less. In this Example, it was as low as 3%. Incidentally, the emergence of the subpeak presumably has a relation with the adhesion of the thin layer; when there are peeled portions in the thin magnetic metal layer, the subpeaks appear due to the pseudo-gap effect.

EXAMPLE b 3

Figure 8:
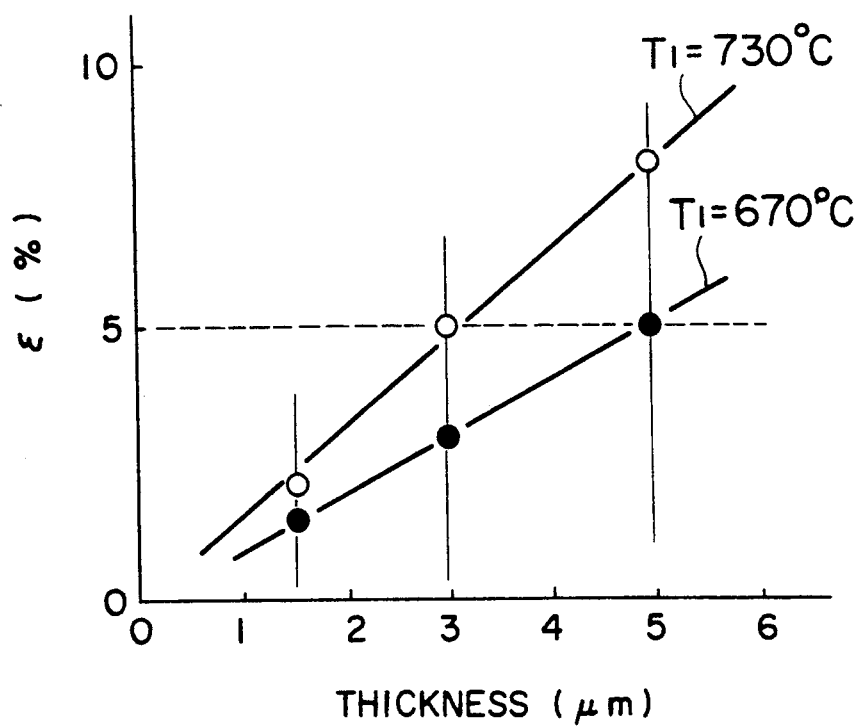
FIG. 8 is a graph showing the relations between metal layer thickness and ε (%) at various first bonding temperatures.

Thin Fe-Al-Si layers of various thicknesses were formed in the same manner as in Example 2, and magnetic cores were produced by first bonding at 670° C. and 730° C., respectively, and then were assembled into magnetic heads to measure peaks of reproduced outputs. The measured data were used to calculate $\epsilon$ (%). The results are shown in FIG. 8. It is clear from FIG. 8 that as the metal layer thickness becomes larger and as the first bonding temperature becomes higher, the $\epsilon$ (%) increases.

Figure 9:
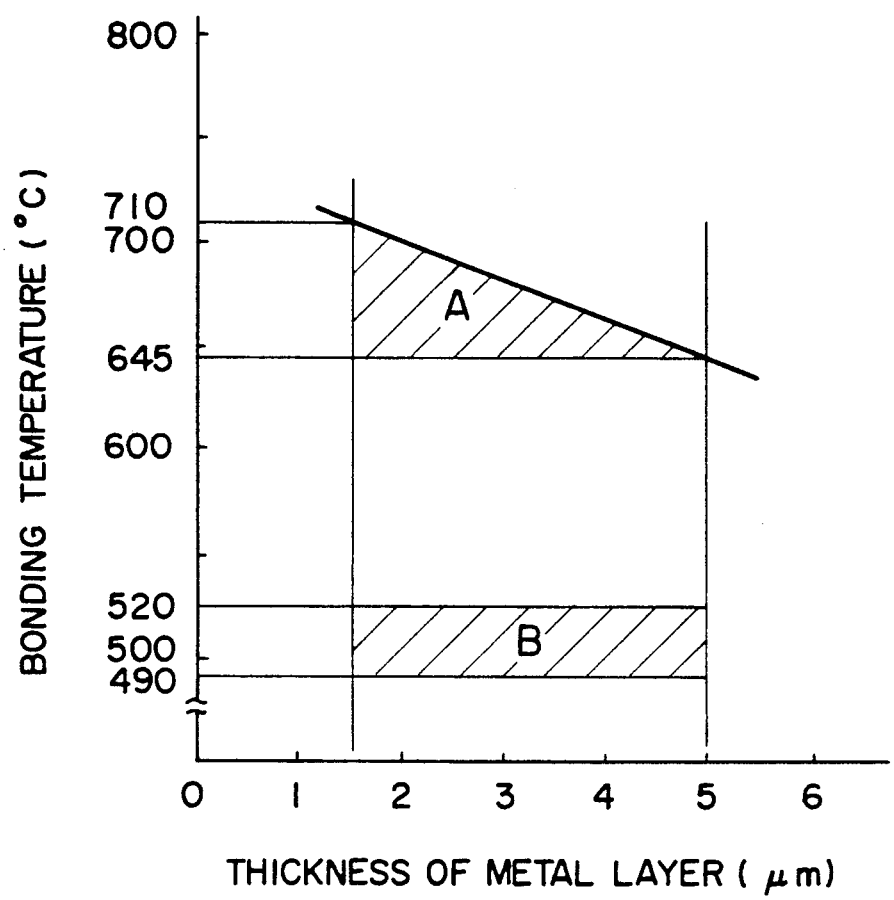
FIG. 9 is a graph showing the relations between metal layer thickness and bonding temperatures.

Based on the results of FIG. 8, the permissible ranges of bonding temperatures were obtained relative to the metal layer thickness. The results are shown in FIG. 9, in which a region A denotes a permissible range of the first bonding temperature and a region B denotes a permissible range of the second bonding temperature. In the magnetic head in this Example, when the layer thickness is 1.5 μm, the first bonding temperature $T_1$ is about 710° C. or less, and when the layer thickness is 5 μm, $T_1$ is 645° C. or less. In addition, since the softening point of the first glass is 573° C., $T_1$ should be 643° C. or higher. On the other hand, since the first glass has a yielding temperature of 520° C. and the second glass has a softening point of 420° C., the region B of the second bonding temperature is 490°–520° C.

EXAMPLE 4

Comparative tests were conducted by using 16 types of glasses shown in Table 1.

Figure 10:
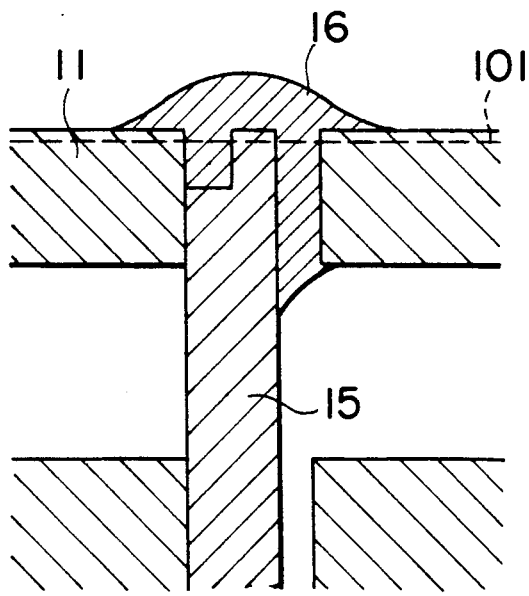
FIG. 10 is a cross-sectional view showing the lapping of an assembled magnetic core.

The non-magnetic slider used was a $CaTiO_3$ slider having a thermal expansion coefficient of $108 \times 10^{-7}/°C.$, and the core used was an Mn-Zn ferrite core having a thermal expansion coefficient of $117 \times 10^{-7}/°C.$ These slider and core were those worked as shown in FIGS. 1 and 2. This slider 11 and the magnetic core 15 were assembled, and a second glass rod 68 was disposed as in FIG. 5, and heated at 540° C. for 10 minutes in a nitrogen atmosphere. Further, the resulting magnetic head was lapped to a line 101 in FIG. 10 for finishing. Each magnetic head thus produced was immersed in a 0.020-weight % phosphoric acid aqueous solution at 20° C. for 10 seconds, and then fully dried. Thereafter, the erosion of the second glass was measured on each magnetic head. The results are shown in Table 1.

TABLE 1

| Sample No. | Composition (weight %) | | | | Softening Temp. Ts (°C.) | Thermal[1] Expansion Coefficient α ($\times 10^{-7}/°C.$) | Glass Erosion[2] (nm) |
| --- | --- | --- | --- | --- | --- | --- | --- |
| | $Al_2O_3$ | $SiO_2$ | $B_2O_3$ | PbO | | | |
| 1 | 0 | 13 | 7 | 80 | 412 | 98 | 71 |
| 2 | 3 | 10 | 7 | 80 | 419 | 95 | 46 |
| 3 | 4 | 9 | 7 | 80 | 420 | 94 | 40 |
| 4 | 5 | 8 | 7 | 80 | 423 | 94 | 33 |
| 5 | 6 | 7 | 7 | 80 | 425 | 92 | 15 |
| 6 | 7 | 6 | 7 | 80 | 428 | 92 | 5 |
| 7 | 8 | 5 | 7 | 80 | 431 | 91 | 0 |
| 8 | 9 | 4 | 7 | 80 | Crystallized[3] | — | — |
| 9 | 8 | 4.5 | 7.5 | 80 | 427 | 92 | 0 |
| 10 | 7 | 6.5 | 6.5 | 80 | 433 | 92 | 3 |
| 11 | 6 | 8.5 | 5.5 | 80 | 436 | 93 | 10 |
| 12 | 6 | 7 | 9.5 | 77.5 | 426 | 88 | 16 |
| 13 | 6 | 7 | 9 | 78 | 425 | 90 | 15 |
| 14 | 6 | 7 | 5 | 82 | 430 | 95 | 12 |
| 15 | 6 | 7 | 4.5 | 82.5 | 432 | 96 | 14 |
| 16 | 6 | 7 | 4 | 83 | Crystallized[3] | — | — |

Note:
[1]Thermal expansion coefficient at 30–280° C.
[2]Expressed by a height of a step between the eroded glass and the other surface.
[3]Crystallization took place when a glass rod was produced.

If those with eroded steps smaller than 20 nm in height are defined as "good," 10 glasses of Sample Nos. 5–7 and 9–15 are regarded as good, having excellent acid resistance. These results show that the second glass of the present invention has much better acid resistance than conventional low-melting point glasses (Sample Nos. 2 and 3) of Japanese Patent Laid-Open No. 60-243182.

Next, the above 10 glasses were subjected to water resistance test and humidity resistance test. First, they were immersed in pure water at 60° C. for 2 hours to measure the eroded levels expressed by the heights of steps between the second glass surfaces and the other surfaces. In all of the above 10 glasses, the steps were less than 20 nm, showing that they have good water resistance. Also, in a humidity test in an atmosphere at 60° C. and 90% RH for 96 hours, no discoloration took place in the second glass, showing that they have excellent humidity resistance.

EXAMPLE 5

Figure 11:
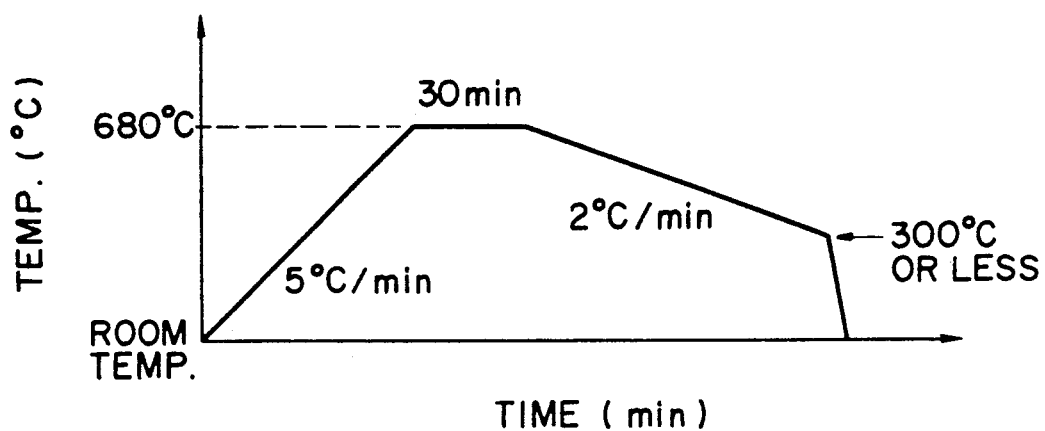
FIG. 11 is a graph showing one example of the temperature conditions of a second bonding step.
Figure 12:
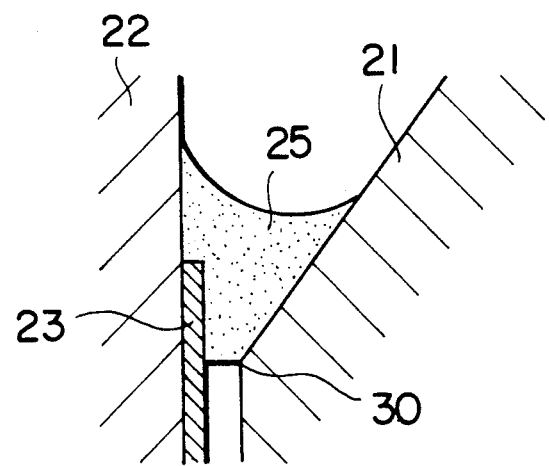
FIG. 12 is a partial cross-sectional view showing a first glass flowing toward a magnetic gap by a first bonding step.

An $SiO_2$ layer and a glass layer were formed by sputtering respectively on a I-shaped core piece provided with a Sendust layer and a C-shaped core piece, and they were assembled by using a jig shown in FIG. 4. A rod (diameter: 0.20–0.25 mm) of a first glass having the composition shown in Table 2 was inserted into a wire-winding window of each assembled core block, and heated in an $N_2$ atmosphere for first bonding. The temperature conditions were as shown in FIG. 11. The bonded core blocks thus produced were cut to observe the flowability of the first glass. With respect to the flowability, as shown in FIG. 12, a case where the first glass flowed up to an apex 30 of the core was regarded as "good," and the other case as "poor." The results are shown in Table 2.

TABLE 2

| Sample No. | First Glass Composition (weight %) | | | | |
| --- | --- | --- | --- | --- | --- |
| | $SiO_2$ | $B_2O_3$ | $Al_2O_3$ | $Na_2O$ | PbO |
| 1 | 40 | 8 | 7 | 10 | 35 |
| 2 | 44 | 12 | — | 14 | 30 |
| 3 | 39 | 11 | — | 9 | 41 |
| 4 | 37 | 14 | — | 11 | 38 |
| 5 | 30 | 5 | — | 5 | 60 |

| Sample No. | Softening Temp. Ts (°C.) | Yielding Temp. Mg (°C.) | α* ($\times 10^{-7}/°C.$) |
| --- | --- | --- | --- |
| 1 | 610 | 520 | 91 |
| 2 | 600 | 532 | 96 |
| 3 | 571 | 508 | 93 |
| 4 | 568 | 515 | 95 |
| 5 | 532 | 455 | 92 |

Note*:
Thermal expansion coefficient at 30–380° C.

TABLE 3

| | Sample No. | | | | |
| --- | --- | --- | --- | --- | --- |
| | 1 | 2 | 3 | 4 | 5 |
| Flowability | x | x | ... | ... | ... |

Note:
... Samples in which the flowability of the first glass was "poor" were less than 2% of all the samples.
x ... Those in which the flowability of the first glass was "poor" were 2% or more.

It is clear from the above results that when the first bonding is conducted at 680° C. or lower, the first glass which does not satisfy the compositional requirements of 35–40 weight % $SiO_2$, 9–15 weight % $B_2O_3$, 9–12 weight % $Na_2O$ and 36–42 weight % PbO also does not show sufficient flowability.

Next, each magnetic core was disposed in a slit of a slider as shown in FIG. 5, and second bonding was conducted by using a second glass rod having the following composition:

| Second Glass | |
| --- | --- |
| SiO$_2$ | 6.0 weight % |
| B$_2$O$_3$ | 7.5 weight % |
| Al$_2$O$_3$ | 6.5 weight % |
| PbO | 80.0 weight % |
| Softening point Ts | 419° C. |
| Thermal expansion coefficient α (30° C.–280° C.) | 92 × 10$^{-7}$/°C. |

Since the optimum bonding temperature of this second glass is 505° C., the second bonding was conducted at that temperature. The changes of the magnetic gaps were measured.

The results are shown in Table 4.

TABLE 4

| | Sample No. | | |
| --- | --- | --- | --- |
| | 3 | 4 | 5 |
| Conditions of Magnetic Gap | | | x |

Note:
... No loosening and expansion.
x ... The magnetic gap was loosened or expanded.

It is clear from the above results that Sample No. 5 (outside the composition range of the first glass) suffered from the changes of the magnetic gap by the second bonding at 505° C.

Thus, by conducting the first bonding at 680° C. by using the first glass having the composition (by weight) of 35–40% SiO$_2$, 9–15% B$_2$O$_3$, 9–12% Na$_2$O and 36–42% PbO, and also by conducting the second bonding at 505° C., good magnetic heads free from the peeling of thin Sendust layers and the loosening or expansion of the magnetic gaps can be obtained.

As described above in detail, the flying-type composite magnetic head of the present invention is assembled by using the first and second glasses having particular temperature characteristics at the first and second bonding temperatures closely related to the thickness of a thin magnetic metal layer. Accordingly, there are no problems of the peeling of the thin magnetic metal layer and the cracking of the core pieces, thereby showing excellent output characteristics.

Further, by using the preferred first and second glasses, the problems of the peeling of the thin metal layer and the changes of the magnetic gap can be more completely avoided.

In addition, since the preferred second glass has good corrosion resistance, it can provide the magnetic head substantially free from the discoloration of the glass.

What is claimed is:

1. A flying-type composite magnetic head comprising:
   (a) a magnetic core constituted by a pair of core pieces bonded together by a first glass portion, at least one of opposing surfaces of said core pieces being formed with a thin magnetic metal layer having a thickness of 1.5 to 5.0 μm; and,
   (b) a non-magnetic slider having a slit in which said magnetic core is fixed by a second glass portion, wherein said first glass portion has a softening point of 560°–580° C. and a yielding temperature of 500°–530° C., and said second glass portion has a softening point of 410°–450° C.

2. The flying-type composite magnetic head according to claim 1, wherein said first glass portion has a composition consisting essentially of 35–40 weight % of SiO$_2$, 9–15 weight % of B$_2$O$_3$, 9–12 weight % of at least one alkali metal oxide and 36–42 weight % of PbO, and said first glass portion has a yielding temperature of 505°–520° C.

3. The flying-type composite magnetic head according to claim 2, wherein said alkali metal oxide is Na$_2$O.

4. The flying-type composite magnetic head according to claim 1, wherein said second glass portion has a composition consisting essentially of 4.5–8.5 weight % of SiO$_2$, 4.5–9.5 weight % of B$_2$O$_3$, 6–8 weight % of Al$_2$O$_3$ and 77.5–82.5 weight % of PbO.

5. The flying-type composite magnetic head according to claim 4, wherein said second glass portion has a softening point of 412°–436° C., and a thermal expansion coefficient of 88–96×10$^{-7}$/°C. between 30°–280° C.

* * * * *

UNITED STATES PATENT AND TRADEMARK OFFICE
CERTIFICATE OF CORRECTION

PATENT NO. : 5,016,129
DATED : MAY 14, 1991
INVENTOR(S) : RYO GOTO ET AL.

It is certified that error appears in the above-identified patent and that said Letters Patent is hereby corrected as shown below:

Col. 2, line 15, "thus" should be --then--.

Col. 3, line 13, "60-243182" should be --60-103808--.

Col. 5, line 52, "for or" should be --for restricting or--.

Col. 9, line 66, "60-243182," should be --60-103808,--.

Col. 13, line 47, "60-243182." should be --60-103808.--.

Col. 14, line 56, "x    x" should be --x    x    0    0    0--;
line 58, "... Samples" should be --0 ... Samples--.

Signed and Sealed this

Thirteenth Day of April, 1993

Attest:

STEPHEN G. KUNIN

Attesting Officer    Acting Commissioner of Patents and Trademarks